US012589596B2

(12) United States Patent
Suzuki et al.

(10) Patent No.: US 12,589,596 B2
(45) Date of Patent: Mar. 31, 2026

(54) INKJET PRINTING APPARATUS

(71) Applicant: SCREEN Holdings Co., Ltd., Kyoto (JP)

(72) Inventors: Yuto Suzuki, Kyoto (JP); Hideaki Onishi, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 128 days.

(21) Appl. No.: 18/791,879

(22) Filed: Aug. 1, 2024

(65) Prior Publication Data

US 2025/0100291 A1 Mar. 27, 2025

(30) Foreign Application Priority Data

Sep. 22, 2023 (JP) ................................ 2023-158347
Sep. 22, 2023 (JP) ................................ 2023-158348

(51) Int. Cl.

*B41J 2/175* (2006.01)
*B41J 2/045* (2006.01)
*B41J 2/185* (2006.01)

(52) U.S. Cl.

CPC ....... *B41J 2/17596* (2013.01); *B41J 2/04551* (2013.01); *B41J 2/04563* (2013.01); *B41J 2/17566* (2013.01); *B41J 2/185* (2013.01); *B41J 2202/12* (2013.01)

(58) Field of Classification Search

CPC . B41J 2/175; B41J 2/17596; B41J 2/18; B41J 2/04563; B41J 2/185; B41J 2202/12
See application file for complete search history.

(56) References Cited

U.S. PATENT DOCUMENTS

| | | | | |
|---|---|---|---|---|
| 9,365,046 B2 * | 6/2016 | Sugitani | B41J 2/18 | |
| 9,421,780 B2 * | 8/2016 | Nishiyama | B41J 2/18 | |
| 2010/0177148 A1 * | 7/2010 | Asami | B41J 2/18 | 347/85 |
| 2010/0247769 A1 * | 9/2010 | Ooishi | B41J 2/17553 | 347/85 |
| 2010/0283808 A1 * | 11/2010 | Terakado | B41J 2/18 | 347/6 |
| 2011/0242156 A1 * | 10/2011 | Shimoda | B41J 2/18 | 347/6 |

(Continued)

FOREIGN PATENT DOCUMENTS

JP 3419220 B 6/2003

*Primary Examiner* — John P Zimmermann
(74) *Attorney, Agent, or Firm* — Rimon P.C.

(57) ABSTRACT

This apparatus includes an external tank in which ink is stored outside a circulation path, a branch pipe connecting a branch point on the circulation path and the external tank, an external pump that delivers ink from the external tank to the circulation path, a switch valve, and a temperature sensor that detects a temperature of ink in the circulation path. The switch valve can switch between a state in which the external tank communicates with the branch point via the external pump and the branch pipe and a state in which the external tank communicates with the branch point not via the external pump, but via the bypass pipe. When a result of detection by the temperature sensor is out of a predetermined range, a control unit can deliver ink in the circulation path to the external tank via the bypass pipe.

6 Claims, 6 Drawing Sheets

(56) References Cited

U.S. PATENT DOCUMENTS

| | | | | |
|---|---|---|---|---|
| 2012/0299989 | A1 * | 11/2012 | Prothon | B41J 2/17596 347/6 |
| 2013/0106963 | A1 * | 5/2013 | Kawase | B41J 2/18 347/85 |
| 2016/0031226 | A1 * | 2/2016 | Nishiyama | B41J 2/175 347/85 |

* cited by examiner

INKJET PRINTING APPARATUS

RELATED APPLICATIONS

This application claims the benefit of Japanese applications No. 2023-158347 and No. 2023-158348, filed on 22 Sep. 2023, the disclosure of which is incorporated by reference herein.

BACKGROUND OF THE INVENTION

Field of the Invention

The present invention relates to an inkjet printing apparatus that discharges ink onto a printing medium such as paper to perform printing.

Description of the Background Art

Conventionally, an inkjet printing apparatus includes an ink circulation path in which ink is supplied to a discharge head configured to discharge ink onto a printing medium and ink being left undischarged in the discharge head is collected and again supplied to the discharge head, in some cases. An inkjet printing apparatus including such an ink circulation path as mentioned above is described in, for example, Japanese Patent No. 3419220.

In an inkjet recording apparatus according to Japanese Patent No. 3419220, an ink bag (41) in a cartridge (6) is pressurized, so that ink in the ink bag (41) flows into an inkjet recording head (8), and a part of the ink passes through the head and flows into a sub tank (10). Further, the sub tank (10) is replenished with new ink (see paragraphs [0022] to [0023] and FIG. 4). As a result, ink remaining in the vicinity of a nozzle opening (21) of the inkjet recording head (8) is discharged to the sub tank (10) and is mixed with the new ink having been supplied to the sub tank (see paragraph [0024]).

After that, the ink in the sub tank (10) passes through the inkjet recording head (8) due to a head difference based on a level difference with respect to the cartridge (6), and flows back to the ink cartridge (6). Then, such reciprocating circulation in which ink flows between the sub tank (10) and the ink cartridge (6) via the inkjet recording head (8) is repeated.

In this regard, it is preferred to set the temperature of the ink to, for example, approximately 35° C. in order to stably discharge ink from a discharge head. However, in a case in which ink is left in a circulation path with an apparatus being kept undriven for a long period of time, the temperature of the ink is found excessively low when trying to re-drive the apparatus, in some cases. Meanwhile, when ink having an excessively low temperature is heated at a stretch by using a heater or the like, conversely, the temperature of the ink becomes excessively high, in some cases. In such a case as described in which a temperature of ink is excessively high or low, it is difficult to adjust the temperature of ink to a temperature suitable for discharge, which possibly degrades the workability.

Moreover, in the inkjet recording apparatus according to Japanese Patent No. 3419220, it is difficult to accurately grasp an amount of ink actually present in the circulation path extending between the sub tank (10) and the ink cartridge (6) via the inkjet recording head (8). Thus, when an amount of ink actually present in the circulation path is excessively large, it takes time to adjust the temperature thereof in the first place, and hence, there is a fear of further degrading the workability.

SUMMARY OF THE INVENTION

The present invention has been made in view of the above-described situation, and it is an object to provide a technology that enables easy adjustment of a temperature of ink to a temperature suitable for discharge.

To solve the above-described problem, the first invention of the present application is directed to an inkjet printing apparatus that discharges ink onto a printing medium to perform printing, and includes an ink circulation path, a circulation pump, an external tank, a branch pipe, an external pump, a switch valve, a control unit, and a temperature sensor. The circulation path includes a discharge head configured to discharge ink, a supply tank in which ink supplied to the discharge head is stored, a collecting tank in which ink collected from the discharge head is stored, a supply pipe connecting the supply tank and the discharge head, and a feedback pipe connecting the collecting tank and the supply tank. The circulation pump delivers ink from the colleting tank to the supply tank via the feedback pipe. In the external tank, ink is stored outside the circulation path. The branch pipe connects a branch point on the feedback pipe and the external tank. The external pump delivers ink from the external tank to the circulation path via the branch pipe. The switch valve is configured to switch between a state in which the external tank communicates with the branch point via the external pump and the branch pipe and a state in which the external tank communicates with the branch point not via the external pump, but via the bypass pipe connecting the branch pipe and the external tank. The control unit is configured to control the discharge head, the circulation pump, the external pump, and the switch valve. The temperature sensor detects a temperature of ink in the circulation path. The control unit is capable of selectively performing a replenishment mode in which ink in the external tank is delivered to the circulation path via the branch pipe and a backflow mode in which ink in the circulation path is delivered to the external tank via the bypass pipe. When the control unit detects that a result of detection performed by the temperature sensor is out of a predetermined range, the control unit performs the backflow mode, and performs the replenishment mode after the backflow mode.

The second invention of the present application is directed to the inkjet printing apparatus according to the first invention. The switch valve is a three-way valve including a flow inlet, a flow outlet, and a flow-in/flow-out port. The flow inlet communicates with the external pump. The flow outlet communicates with the external tank via the bypass pipe. The flow-in/flow-out port communicates with the circulation path. The control unit drives the circulation pump and the external pump while closing the flow outlet of the switch valve to cause the flow inlet and the flow-in/flow-out port to communicate with each other, in the replenishment mode. The control unit drives the circulation pump and stops driving the external pump while closing the flow inlet of the switch valve to cause the flow outlet and the flow-in/flow-out port to communicate with each other, in the backflow mode.

The third invention of the present application is directed to the inkjet printing apparatus according to the first invention, further including a supply-side on-off valve, a feedback-side on-off valve, and a pressurization mechanism. The supply-side on-off valve is interposed in the supply pipe.

The feedback-side on-off valve is interposed between the circulation pump and the branch point in the feedback pipe. The pressurization mechanism pressurizes an inside of the supply tank. The switch valve is a three-way valve including a flow inlet, a flow outlet, and a flow-in/flow-out port. The flow inlet communicates with the external pump. The flow outlet communicates with the external tank via the bypass pipe. The flow-in/flow-out port communicates with the circulation path. The control unit is capable of further controlling the supply-side on-off valve, the feedback-side on-off valve, and the pressurization mechanism. The control unit drives the circulation pump and the external pump while closing the flow outlet of the switch valve to cause the flow inlet and the flow-in/flow-out port to communicate with each other, in the replenishment mode. The control unit closes the flow inlet of the switch valve to cause the flow outlet and the flow-in/flow-out port to communicate with each other, stops driving the circulation pump and the external pump, and drives the pressurization mechanism while closing the supply-side on-off valve and the feedback-side on-off valve, in the backflow mode.

The fourth invention of the present application is directed to an inkjet printing apparatus that discharges ink onto a printing medium to perform printing and includes an ink circulation path, a circulation pump, an external tank, a branch pipe, an external pump, a switch valve, a control unit, a first liquid-level sensor, and a second liquid-level sensor. The circulation path includes a discharge head configured to discharge ink, a supply tank in which ink supplied to the discharge head is stored, a collecting tank in which ink collected from the discharge head is stored, a supply pipe connecting the supply tank and the discharge head, and a feedback pipe connecting the collecting tank and the supply tank. The circulation pump delivers ink from the collecting tank to the supply tank via the feedback pipe. In the external tank, ink is stored outside the circulation path. The branch pipe connects a branch point on the feedback pipe and the external tank. The external pump delivers ink from the external tank to the circulation path via the branch pipe. The switch valve is configured to switch between a state in which the external tank communicates with the branch point via the external pump and the branch pipe and a state in which the external tank communicates with the branch point not via the external pump, but via the bypass pipe connecting the branch pipe and the external tank. The control unit is configured to control the discharge head, the circulation pump, the external pump, and the switch valve. The first liquid-level sensor detects that a liquid level of ink stored in the supply tank is at a height of a first reference value. The second liquid-level sensor detects that a liquid level of ink stored in the collecting tank is at a height of a second reference value. The control unit is capable of selectively performing a replenishment mode in which ink in the external tank is delivered to the circulation path via the branch pipe and a backflow mode in which ink in the circulation path is delivered to the external tank via the bypass pipe. When the control unit detects that the liquid level of ink stored in the supply tank is at a height exceeding the first reference value, from a result of detection performed by the first liquid-level sensor, and detects that the liquid level of ink stored in the collecting tank is at a height exceeding the second reference value, from a result of detection performed by the second liquid-level sensor, the control unit performs the backflow mode and performs the replenishment mode after the backflow mode.

The fifth invention of the present application is directed to the inkjet printing apparatus according to the fourth invention. The switch valve is a three-way valve including a flow inlet, a flow outlet, and a flow-in/flow-out port. The flow inlet communicates with the external pump. The flow outlet communicates with the external tank via the bypass pipe. The flow-in/flow-out port communicates with the circulation path. The control unit drives the circulation pump and the external pump while closing the flow outlet of the switch valve to cause the flow inlet and the flow-in/flow-out port to communicate with each other, in the replenishment mode, and the control unit drives the circulation pump and stops driving the external pump while closing the flow inlet of the switch valve to cause the flow outlet and the flow-in/flow-out port to communicate with each other, in the backflow mode.

The sixth invention of the present application is directed to the inkjet printing apparatus according to the fourth invention, further including a supply-side on-off valve, a feedback-side on-off valve, and a pressurization mechanism. The supply-side on-off valve is interposed in the supply pipe. The feedback-side on-off valve is interposed between the circulation pump and the branch point in the feedback pipe. The pressurization mechanism pressurizes an inside of the supply tank. The switch valve is a three-way valve including a flow inlet, a flow outlet, and a flow-in/flow-out port. The flow inlet communicates with the external pump. The flow outlet communicates with the external tank via the bypass pipe. The flow-in/flow-out port communicates with the circulation path. The control unit is capable of further controlling the supply-side on-off valve, the feedback-side on-off valve, and the pressurization mechanism. The control unit drives the circulation pump and the external pump while closing the flow outlet of the switch valve to cause the flow inlet and the flow-in/flow-out port to communicate with each other, in the replenishment mode. The control unit closes the flow inlet of the switch valve to cause the flow outlet and the flow-in/flow-out port to communicate with each other, stops driving the circulation pump and the external pump, and drives the pressurization mechanism while closing the supply-side on-off valve and the feedback-side on-off valve, in the backflow mode.

According to the first to sixth inventions of the present application, by causing a part of ink in the circulation path to flow back to the external tank, it is possible to rapidly adjust a temperature of the ink.

DESCRIPTION OF THE PREFERRED EMBODIMENTS

Figure 1:
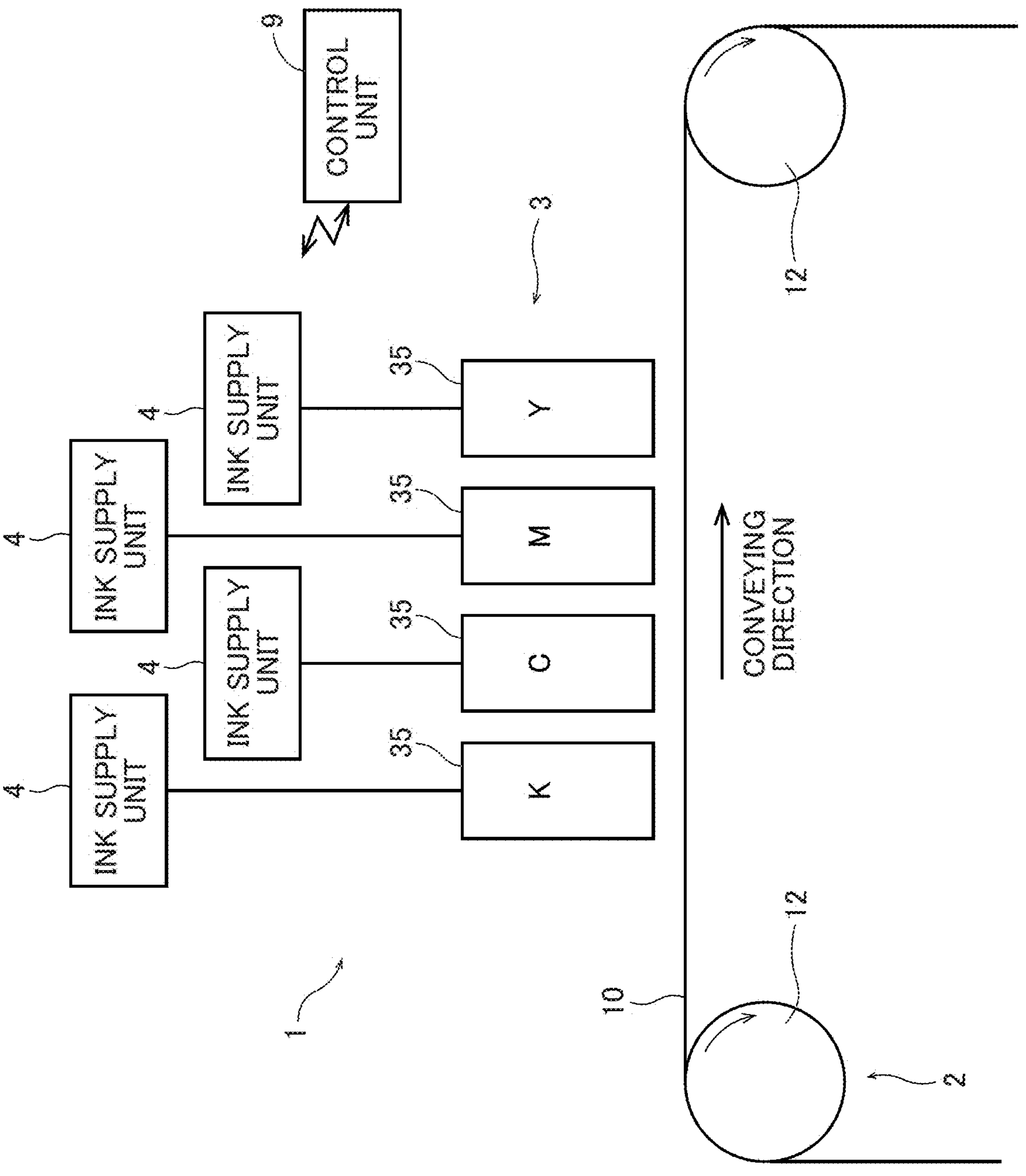
FIG. 1 is a view conceptually showing a configuration of an inkjet printing apparatus.

Hereinafter, preferred embodiments of the present invention will be described with reference to the drawings. Note that components described in the preferred embodiments are mere examples and are not intended to limit the scope of the present invention to those only. In the drawings, for the purpose of easier understanding, the dimensions or the number of respective components are overstated or understated in some portions of illustration, as necessary.

1. Configuration of Inkjet Printing Apparatus

FIG. 1 is a view conceptually showing a configuration of an inkjet printing apparatus 1 according to one preferred embodiment of the present invention. The inkjet printing apparatus 1 is an inkjet printing machine that discharges droplets of water-based ink toward continuous paper 10 in a shape of a long strip from a plurality of discharge heads 35 while conveying the continuous paper 10, to record characters or images on a surface of the continuous paper 10. Meanwhile, the continuous paper 10 in a shape of a long strip is simply one example of a printing medium. The printing medium may be a cut sheet, a plastic film, a cardboard, metal foil, a material made of glass, or the like. In other words, the inkjet printing apparatus 1 may be any apparatus that can discharge ink toward a printing medium, to perform printing. As shown in FIG. 1, the inkjet printing apparatus 1 includes a conveyor unit 2, a printing unit 3, and a control unit 9.

The conveyor unit 2 is a mechanism configured to convey the continuous paper 10 along a predetermined conveying path in a conveying direction extending along the lengthwise direction of the continuous paper 10. The continuous paper 10 is stretched over a plurality of conveyor rollers 12. The continuous paper 10 is conveyed along a conveying path formed by the plurality of conveyor rollers 12. Each of the conveyor rollers 12 rotates about an axis extending in a direction perpendicular to the conveying direction, to thereby guide the continuous paper 10 to a downstream side in the conveying path. Further, the continuous paper 10 is under tension in the conveying direction. This reduces slack or wrinkles in the continuous paper 10 during conveying.

The printing unit 3 includes a plurality of discharge heads 35 and a plurality of ink supply units 4. In the present preferred embodiment, the printing unit 3 includes four discharge heads 35 and four ink supply units 4. The four discharge heads 35 have substantially the same configuration with each other. Further, the four ink supply units 4 have substantially the same configuration with each other.

The four discharge heads 35 are arranged while being spaced from each other along the conveying direction. Each of the four discharge heads 35 discharges ink droplets toward a surface (upper surface) of the continuous paper 10 from nozzles 83 (refer to FIG. 2 described later). In the present preferred embodiment, the four discharge heads 35 discharge ink in different colors, respectively, to thereby each record a monochromatic image on the surface (upper surface) of the continuous paper 10. For example, the four discharge heads 35 discharge cyan ink, magenta ink, yellow ink, and black ink, respectively, to thereby each record a monochromatic image on the surface (upper surface) of the continuous paper 10. Then, the four monochromatic images are superimposed, so that a multicolor image is formed on the upper surface of the continuous paper 10.

Figure 2:
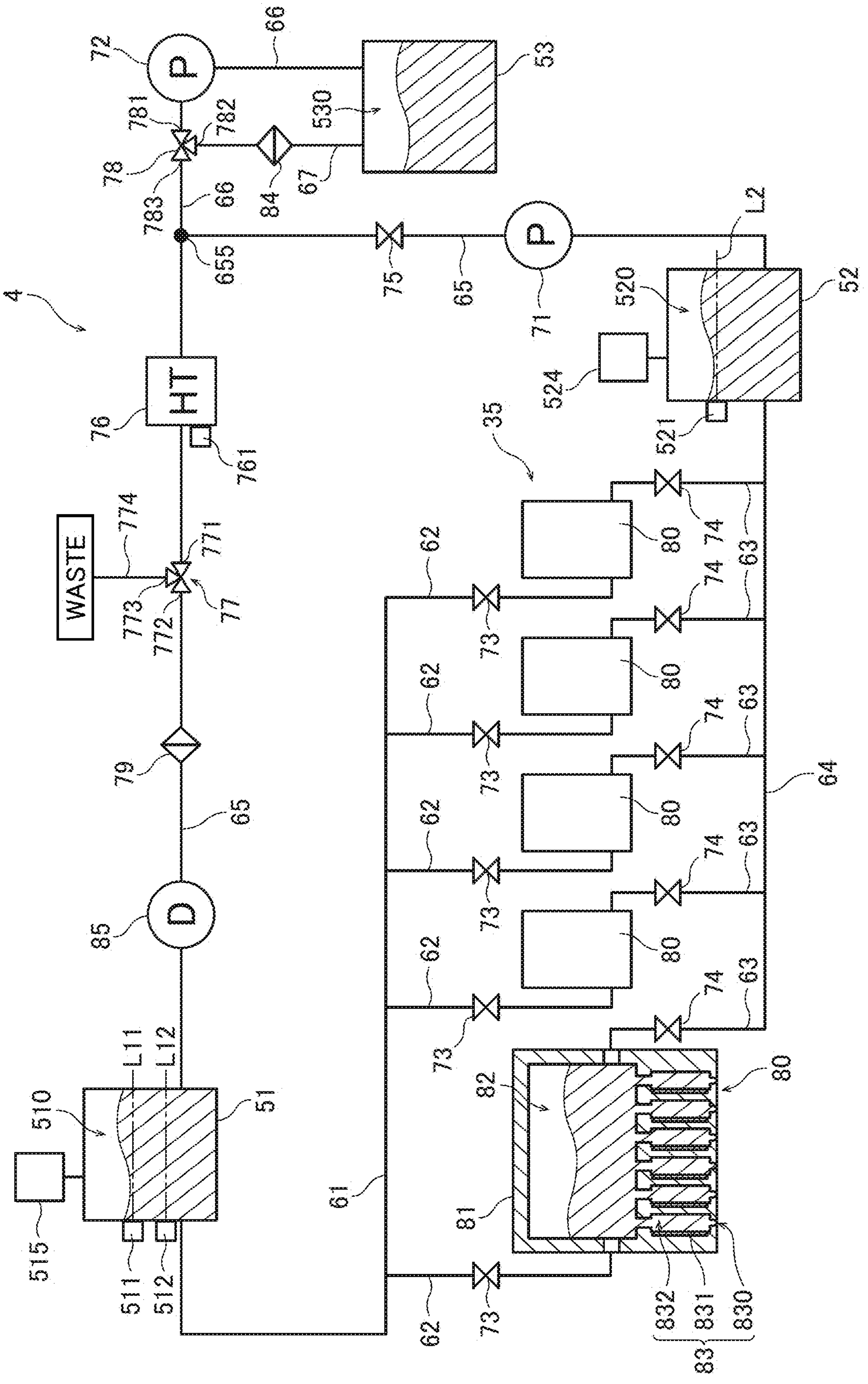
FIG. 2 is a view conceptually showing configurations of an ink supply unit and a discharge head.

FIG. 2 is a view conceptually showing a configuration of one ink supply unit 4 and a configuration of one discharge head 35. In the present preferred embodiment, each of the discharge heads 35 includes a plurality of heads 80. In the present preferred embodiment, each of the discharge heads 35 includes five heads 80. The five heads 80 have substantially the same configuration with each other. Hence, in FIG. 2, only one of the five heads 80 is shown in detail, and the other four heads 80 are shown in a simplified manner. As shown in FIG. 2, each of the five heads 80 includes a casing 81, an internal tank 82, and a plurality of nozzles 83.

The casing 81 forms an outer frame of the head 80. The internal tank 82 is provided in the casing 81, and ink can be temporarily stored there. The plurality of nozzles 83 are arranged while being equally spaced from each other along the conveying direction and a widthwise direction of the continuous paper 10 in the lower portion of the casing 81. Each of the plurality of nozzles 83 communicates with the internal tank 82. Further, each of the plurality of nozzles 83 includes a plurality of piezoelectric elements 831 serving as pressure generation elements, an ink chamber 832, and a discharge port 830. The ink chamber 832 communicates with the internal tank 82.

During discharge of ink, ink flows down from the internal tank 82 to the ink chamber 832. Then, under the control of the piezoelectric elements 831, ink in the ink chamber 832 is pressurized, and thus is discharged in the form of liquid droplets from the discharge port 830. Alternatively, the nozzle 83 may be one adapted to a so-called thermal method in which ink in the ink chamber 832 is heated to generate bubbles and thus is pressurized.

Next, the ink supply unit 4 is described. The ink supply unit 4 is a device configured to circulate a part of ink while supplying ink to the discharge head 35. As described above, the inkjet printing apparatus 1 of the present preferred embodiment includes four ink supply units 4. The four ink supply units 4 have substantially the same configuration with each other, and hence only a configuration of one ink supply unit 4 is described below.

As shown in FIG. 2, each of the ink supply units 4 includes a supply tank 51, a collecting tank 52, an external tank 53, a supply-side manifold 61, a plurality of supply-side narrow pipes 62, a plurality of collecting-side narrow pipes 63, a collecting-side manifold 64, a feedback pipe 65, a branch pipe 66, a bypass pipe 67, a circulation pump 71, an external pump 72, a plurality of supply-side on-off valves 73, a plurality of head outlet-side on-off valves 74, a feedback-side on-off valve 75, a heater 76, a first switch valve 77, a second switch valve 78, a first filter 79, a second filter 84, and a deaeration unit 85. In the present preferred embodiment, each of the ink supply units 4 includes five supply-side narrow pipes 62, five collecting-side narrow pipes 63, five supply-side on-off valves 73, and five head outlet-side on-off valves 74.

The supply tank 51 is a container for temporally storing ink to be supplied to the discharge head 35. In the supply tank 51, an internal chamber 510 in which ink can be temporally stored is provided. Further, in the supply tank 51, a first upper liquid-level sensor 511 and a first lower liquid-level sensor 512 are mounted.

Each of the first upper liquid-level sensor 511 and the first lower liquid-level sensor 512 is electrically connected to the control unit 9. When detecting that the liquid level of ink stored in the internal chamber 510 of the supply tank 51 is at a height of a first upper reference value L11, the first upper liquid-level sensor 511 outputs a first upper signal to the control unit 9 via a communication circuit not shown. When detecting that the liquid level of ink stored in the internal chamber 510 of the supply tank 51 is at a height of a first lower reference value L12, the first lower liquid-level sensor 512 outputs a first lower signal to the control unit 9 via the communication circuit not shown. Note that the first lower reference value L12 is lower than the first upper reference value L11.

Meanwhile, the above-described first upper liquid-level sensor 511 corresponds to a "first liquid-level sensor" of the present invention. Further, the above-described first upper reference value L11 to be detected by the first upper liquid-level sensor 511 corresponds to a "first reference value" of the present invention. That is, the inkjet printing apparatus 1 includes a first liquid-level sensor (first upper liquid-level sensor 511) that detects that the liquid level of ink stored in the supply tank 51 is at a height of a first reference value (first upper reference value L11).

In addition, in the supply tank 51, there may be further mounted a "Full sensor" that detects that the tank is full of ink stored in the internal chamber 510 and an "Empty sensor" that detects that the tank is empty of ink stored in the internal chamber 510.

The supply-side manifold 61 and the five supply-side narrow pipes 62 are pipes connecting the supply tank 51 and the five heads 80 included in one discharge head 35. The supply-side manifold 61 is a wide pipe having an upstream end that is connected so as to communicate with the internal chamber 510 of the supply tank 51. Each of the five supply-side narrow pipes 62 is a narrow pipe branching from the supply-side manifold 61. Each of the five supply-side narrow pipes 62 has an upstream end communicating with an internal passage of the supply-side manifold 61, and has a downstream end that is connected so as to communicate with the internal tank 82 of one head 80. The supply-side manifold 61 and the five supply-side narrow pipes 62 form a "supply pipe" of the present invention that connects the supply tank 51 and the discharge head 35.

Further, in the present preferred embodiment, the supply-side on-off valve 73 is interposed in each of the supply-side narrow pipes 62. That is, each supply-side on-off valve 73 is interposed in the "supply pipe" described above. For the supply-side on-off valve 73, for example, an electric valve or a solenoid valve that is opened and closed under the control of the control unit 9 is used. Alternatively, for the supply-side on-off valve 73, an on-off valve that is manually opened and closed may be used. While the supply-side on-off valve 73 is closed, communication of an internal passage of the supply-side narrow pipe 62 is blocked. That is, while the supply-side on-off valve 73 is closed, flow of ink from the supply tank 51 to the head 80 is interrupted. Meanwhile, while the supply-side on-off valve 73 is opened, communication of the internal passage of the supply-side narrow pipe 62 is secured. Note that a filter or the like may be further interposed in the supply-side manifold 61 or the five supply-side narrow pipes 62.

The five collecting-side narrow pipes 63 and the collecting-side manifold 64 are pipes connecting the five heads 80 included in one discharge head 35 and the collecting tank 52. Each of the five collecting-side narrow pipes 63 is a narrow pipe branching from the collecting-side manifold 64. Each of the five collecting-side narrow pipes 63 has an upstream end that is connected so as to communicate with the internal tank 82 of one head 80, and has a downstream end that is connected so as to communicate with an internal passage of the collecting-side manifold 64. The collecting-side manifold 64 is a wide pipe of which downstream end is connected so as to communicate with the internal chamber 520 of the collecting tank 52 described later.

Further, in the present preferred embodiment, the head outlet-side on-off valve 74 is interposed in each of the collecting-side narrow pipes 63. For the head outlet-side on-off valve 74, for example, an electric valve or a solenoid valve that is opened and closed under the control of the control unit 9 is used. Alternatively, for the head outlet-side on-off valve 74, an on-off valve that is manually opened and closed may be used. While the head outlet-side on-off valve 74 is closed, communication of an internal passage of the collecting-side narrow pipe 63 is blocked. That is, while the head outlet-side on-off valve 74 is closed, flow of ink from the head 80 to the collecting tank 52 is interrupted. Meanwhile, while the head outlet-side on-off valve 74 is opened, communication of the internal passage of the collecting-side narrow pipe 63 is secured. Note that the head outlet-side on-off valve 74 is not necessarily required to be provided. Further, a filter or the like may be further interposed in the five collecting-side narrow pipes 63 or the collecting-side manifold 64.

The collecting tank 52 is a container for temporally storing ink collected from the discharge head 35. In the collecting tank 52, the internal chamber 520 in which ink can be temporally stored is provided. Further, in the collecting tank 52, the second liquid-level sensor 521 is mounted.

The second liquid-level sensor 521 is electrically connected to the control unit 9. When detecting that the liquid level of ink stored in the internal chamber 520 of the collecting tank 52 is at a height of a second reference value L2, the second liquid-level sensor 521 outputs a second signal to the control unit 9 via a communication circuit not shown. That is, the inkjet printing apparatus 1 includes the second liquid-level sensor 521 that detects that the liquid level of ink stored in the collecting tank 52 is at a height of the second reference value L2.

In addition, in the collecting tank 52, there may be further mounted another liquid-level sensor that detects that the liquid level of ink stored in the internal chamber 520 of the collecting tank 52 is at a height of another reference value. Moreover, a "Full sensor" that detects that the tank is full of ink stored in the internal chamber 520 and an "Empty sensor" that detects that the tank is empty of ink stored in the internal chamber 520 may be further mounted in the collecting tank 52.

Further, as shown in FIG. 2, the supply tank 51 is connected to a pressurization mechanism 515. The pressurization mechanism 515 pressurizes the inside of the supply tank 51, to regulate a pressure of the internal chamber 510 of the supply tank 51 to a positive pressure (higher than the atmospheric pressure). The pressurization mechanism 515 includes, for example, a compressor, a pressurization buffer tank, a pressure regulation mechanism (regulator), and the like. Meanwhile, the collecting tank 52 is connected to a decompression mechanism 524. The decompression mechanism 524 decompresses the inside of the collecting tank 52, to regulate a pressure of the internal chamber 520 of the collecting tank 52 to a negative pressure (lower than the atmospheric pressure). The decompression mechanism 524 includes, for example, a vacuum pump, a decompression buffer tank, a pressure regulation mechanism (regulator), and the like.

Note that the pressurization mechanism 515 and the decompression mechanism 524 are configured such that the operations thereof can be controlled by the control unit 9. When the pressurization mechanism 515 and the decompression mechanism 524 are driven, there is generated a pressure difference between the internal chamber 510 of the supply tank 51 and the internal chamber 520 of the collecting tank 52. This allows ink stored in the supply tank 51 to be supplied to the discharge head 35, and further allows ink remaining in the discharge head 35 to be collected into the collecting tank 52. That is, ink being left undischarged in the discharge head 35 can be collected into the collecting tank 52.

The feedback pipe 65 is a pipe connecting the internal chamber 520 of the collecting tank 52 and the internal chamber 510 of the supply tank 51 such that the internal chambers can communicate with each other. In other words, the feedback pipe 65 connects the collecting tank 52 and the supply tank 51. As shown in FIG. 2, an internal passage of the feedback pipe 65 has an upstream end that is connected so as to communicate with the internal chamber 520 of the collecting tank 52. Further, the internal passage of the feedback pipe 65 has a downstream end that is connected so as to communicate with the internal chamber 510 of the supply tank 51.

With the above-described configuration, there is formed an ink circulation path that extends from the supply tank 51, passes through the supply pipe including the supply-side manifold 61 and the five supply-side narrow pipes 62, the internal tank 82 of the discharge head 35, the collecting-side narrow pipes 63, the collecting-side manifold 64, the collecting tank 52, and the feedback pipe 65, and returns back to the supply tank 51. In other words, the ink circulation path includes the discharge head 35, the supply tank 51, the collecting tank 52, the supply pipe, and the feedback pipe 65.

Further, in the feedback pipe 65, the circulation pump 71, the feedback-side on-off valve 75, the heater 76, the first switch valve 77, the first filter 79, and the deaeration unit 85 are interposed. Note that a branch point 655 between the feedback-side on-off valve 75 and the heater 76 in the ink circulation path within the feedback pipe 65 is connected to the branch pipe 66, details of which will be given later.

The circulation pump 71 is a device configured to perform a liquid-delivery operation of delivering ink from the collecting tank 52 to the supply tank 51 via the feedback pipe 65. The circulation pump 71 generates flow of ink from the collecting tank 52 to the supply tank 51 in the internal passage of the feedback pipe 65 in response to an operation signal from the control unit 9. For the circulation pump 71 of the present preferred embodiment, for example, a pump in which foreign matters such as dust are unlikely to be generated during driving, such as a diaphragm pump, is used. Further, for the circulation pump 71 of the present preferred embodiment, for example, a pump with a larger capacity than that of the external pump 72 is used.

The feedback-side on-off valve 75 is interposed on the downstream side of the circulation pump 71 and on the upstream side of the branch point 655 in the feedback pipe 65. In other words, the feedback-side on-off valve 75 is interposed between the circulation pump 71 and the branch point 655 in the feedback pipe 65. For the feedback-side on-off valve 75, for example, an electric valve or a solenoid valve that is opened and closed under the control of the control unit 9 is used. Alternatively, for the feedback-side on-off valve 75, an on-off valve that is manually opened and closed may be used. While the feedback-side on-off valve 75 is closed, communication of the internal passage of the feedback pipe 65 is blocked. That is, while the feedback-side on-off valve 75 is closed, flow of ink from the collecting tank 52 to the supply tank 51 and backflow of ink from the vicinity of the branch point 655 to the circulation pump 71 are prevented. Meanwhile, while the feedback-side on-off valve 75 is opened, communication of the internal passage of the feedback pipe 65 is secured.

The heater 76 is a device configured to heat ink delivered through the internal passage of the feedback pipe 65. The heater 76 is positioned between the branch point 655 and the supply tank 51 in the feedback pipe 65. Further, a temperature sensor 761 is mounted in the vicinity of an end on the downstream side along a direction of ink delivery in the heater 76. The temperature sensor 761 detects a temperature of ink flowing out of the heater 76. Further, the temperature sensor 761 is electrically connected to the control unit 9. The temperature sensor 761 outputs data regarding a result of detection of an ink temperature, to the control unit 9. Note that the position where the temperature sensor 761 is mounted is not limited to the above-described position. The temperature sensor 761 is only required to detect a temperature of ink in the circulation path and output a result of detection to the control unit 9.

The first switch valve 77 is interposed on the downstream side of the heater 76 and on the upstream side of the first filter 79 in the feedback pipe 65. The first switch valve 77 is a three-way valve that switches the ink circulation path in the internal passage of the feedback pipe 65 to an ink disposal path 774. For the first switch valve 77, for example, an electric valve or a solenoid valve that performs a switching operation under the control of the control unit 9 is used. Alternatively, for the first switch valve 77, a switch valve that manually performs a switching operation may be used. The first switch valve 77 includes a flow inlet 771, a first flow outlet 772, and a second flow outlet 773.

The flow inlet 771 communicates with the heater 76. That is, the flow inlet 771 communicates with the upstream side of the flow inlet 771 in the circulation path. The first flow outlet 772 communicates with the first filter 79. That is, the first flow outlet 772 communicates with the downstream side of the first flow outlet 772 in the circulation path. The second flow outlet 773 communicates with the ink disposal path 774. Normally, the second flow outlet 773 is closed, and the flow inlet 771 and the first flow outlet 772 communicate with each other. As a result, communication of the internal passage of the feedback pipe 65 is secured. Meanwhile, when the first flow outlet 772 is closed, and the flow inlet 771 and the second flow outlet 773 communicate with each other, ink flowing from the flow inlet 771 is directed to the disposal path 774, so that the ink can be disposed of to the outside of the inkjet printing apparatus 1. Note that the first switch valve 77 is not necessarily required to be provided.

The first filter 79 is interposed on the downstream side of the first switch valve 77 and on the upstream side of the deaeration unit 85 in the feedback pipe 65. The first filter 79 filters ink delivered through the internal passage of the feedback pipe 65, to remove foreign matters included in the ink.

The deaeration unit 85 is interposed on the downstream side of the first filter 79 and on the upstream side of the supply tank 51 in the feedback pipe 65. The deaeration unit 85 of the present preferred embodiment is a so-called hollow-fiber membrane deaeration module. The deaeration unit 85 removes bubbles in ink delivered through the internal passage of the feedback pipe 65.

The external tank 53 is a container in which ink is stored outside the circulation path. The external tank 53 is provided outside the ink circulation path in which ink is circulated between the supply tank 51 and the collecting tank 52. In the external tank 53, ink with which the supply tank 51 is to be replenished is stored. In the external tank 53, an internal chamber 530 in which ink can be stored is provided. In the internal chamber 530 of the external tank 53, a sufficient amount of ink is constantly stored.

The branch pipe 66 is a pipe that connects the internal chamber 530 of the external tank 53 and the internal passage of the feedback pipe 65 such that they can communicate with each other. The branch pipe 66 connects the branch point 655 on the feedback pipe 65 and the external tank 53. As shown in FIG. 2, an internal passage of the branch pipe 66 is connected so as to communicate with the internal chamber 530 of the external tank 53 at the upstream end thereof. Further, the internal passage of the branch pipe 66 is connected so as to communicate with the internal passage of the feedback pipe 65 at the above-described branch point 655 positioned at the downstream end thereof. Moreover, in the branch pipe 66, the external pump 72 and the second switch valve 78 are interposed.

The external pump 72 is a device configured to perform a liquid-delivery operation of delivering ink from the external tank 53 to the feedback pipe 65. The external pump 72 delivers ink from the external tank 53 to the circulation path via the branch pipe 66. For the external pump 72 of the present preferred embodiment, for example, a pump having the same type of configuration as the circulation pump 71 is used. For the external pump 72 of the present preferred embodiment, for example, a diaphragm pump is used.

The second switch valve 78 is interposed between the external pump 72 and the branch point 655 in the branch pipe 66. The second switch valve 78 is a three-way valve capable of switching the external tank 53 between a state in which the external tank 53 communicates with the branch point 655 via the external pump 72 and the branch pipe 66 and a state in which the external tank 53 communicates with the branch point 655 not via the external pump 72, but via the bypass pipe 67. Here, the bypass pipe 67 is a pipe connecting the branch pipe 66 and the external tank 53. Meanwhile, for the second switch valve 78, for example, an electric valve or a solenoid valve that performs a switching operation under the control of the control unit 9 is used. Alternatively, for the second switch valve 78, a switch valve that manually performs a switching operation may be used. The second switch valve 78 corresponds to a "switch valve" of the present invention.

The second switch valve 78 includes a flow inlet 781, a flow outlet 782, and a flow-in/flow-out port 783. The flow inlet 781 communicates with the external pump 72 via the branch pipe 66. The flow outlet 782 communicates with the external tank 53 via the bypass pipe 67. The flow-in/flow-out port 783 communicates with the above-described circulation path via the branch pipe 66.

Normally, the flow outlet 782 is closed, and the flow inlet 781 and the flow-in/flow-out port 783 communicate with each other. As a result, communication of the entire internal passage of the branch pipe 66 is secured. Meanwhile, in performing a "backflow mode" described later, the flow inlet 781 is closed, and the flow-in/flow-out port 783 and the flow outlet 782 communicate with each other. This allows the second switch valve 78 to switch normal flow of ink in which ink is delivered from the external tank 53 to the circulation path via the external pump 72, to flow of ink in which ink flows back to the external tank 53 from the circulation path, not via the external pump 72, but via the bypass pipe 67.

As described above, the bypass pipe 67 is a pipe that connects the flow outlet 782 of the second switch valve 78 and the internal chamber 530 of the external tank 53 such that they can communicate with each other. In the bypass pipe 67, the second filter 84 is interposed.

The second filter 84 filters ink delivered through an internal passage of the bypass pipe 67, to remove foreign matters included in the ink. Here, the second filter 84, together with the external tank 53 and the external pump 72, is provided outside the ink circulation path, and is easily detachable from the ink circulation path. Thus, an operator can detach the second filter 84 from the circulation path, and easily remove foreign matters adhering to the second filter 84.

Figure 3:
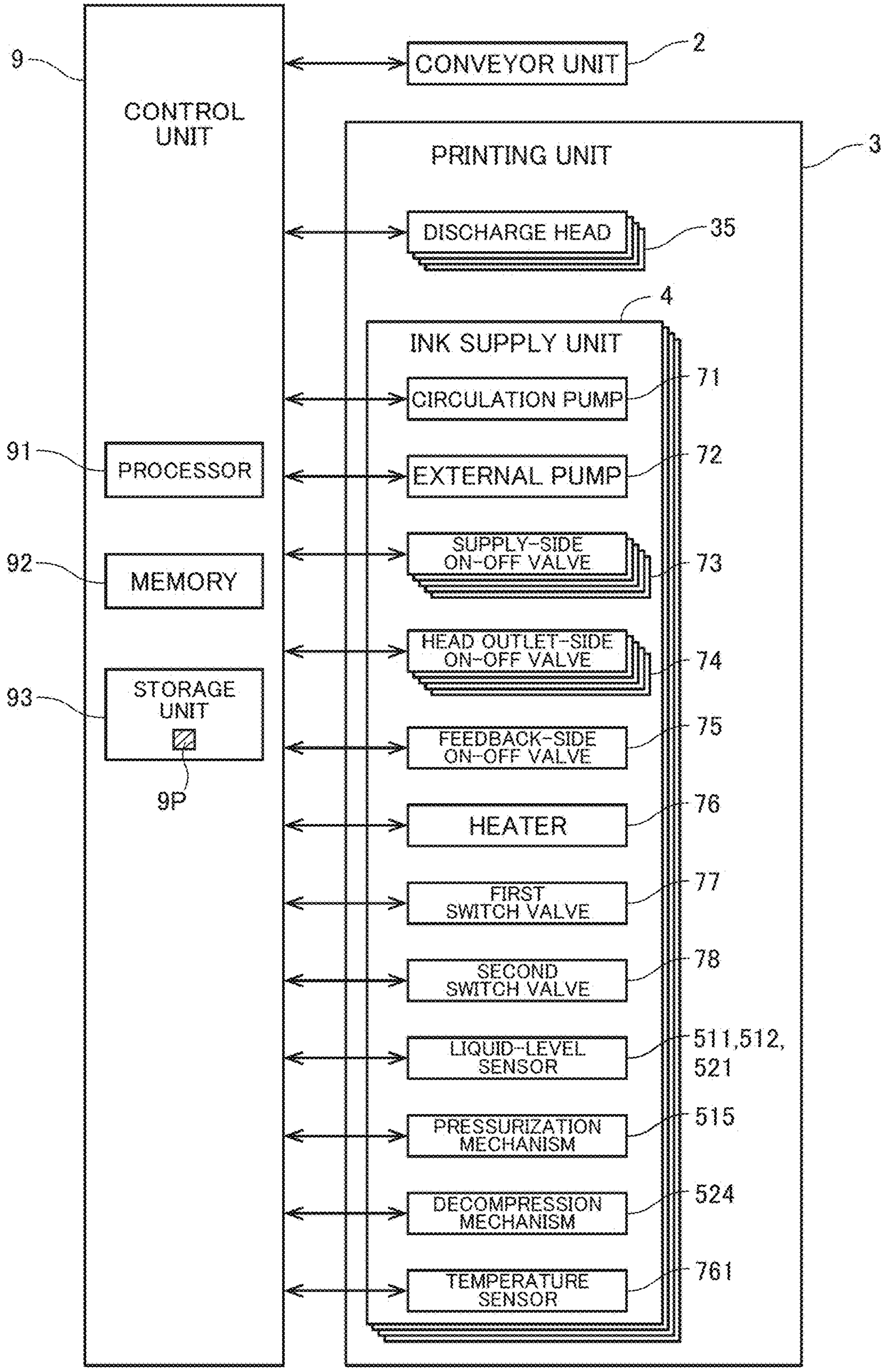
FIG. 3 is a block diagram showing connection between a control unit and each component of the inkjet printing apparatus.

Next, the control unit 9 is described. The control unit 9 is an information processing device configured to control each component of the inkjet printing apparatus 1. FIG. 3 is a block diagram showing connection between the control unit 9 and each component of the inkjet printing apparatus 1. As conceptually shown in FIG. 3, the control unit 9 includes a processor 91 such as a CPU, a memory 92 such as a RAM, and a storage unit 93 such as a hard disk drive. In the storage unit 93, a computer program 9P for performing a printing operation while conveying the continuous paper 10 and supplying ink to the discharge head 35 while circulating a part of the ink is stored.

Further, as shown in FIG. 3, the control unit 9 is connected to the conveyor unit 2 and the four discharge heads 35 of the printing unit 3, and is further connected to the circulation pump 71, the external pump 72, the five supply-side on-off valves 73, the five head outlet-side on-off valves 74, the feedback-side on-off valve 75, the heater 76, the first switch valve 77, the second switch valve 78, each of the liquid-level sensors 511, 512, and 521, the pressurization mechanism 515, the decompression mechanism 524, and the temperature sensor 761 of each of the four ink supply units 4 of the printing unit 3 such that the control unit 9 can conduct communication with the above-described components. The control unit 9 controls operations of those components in accordance with the computer program 9P.

That is, the control unit 9 can control each of the conveyor unit 2, the four discharge heads 35 of the printing unit 3, and the circulation pump 71, the external pump 72, the five supply-side on-off valves 73, the five head outlet-side on-off valves 74, the feedback-side on-off valve 75, the heater 76, the first switch valve 77, the second switch valve 78, each of the liquid-level sensors 511, 512, and 521, the pressurization mechanism 515, the decompression mechanism 524, and the temperature sensor 761 of each of the four ink supply units 4 of the printing unit 3. The control unit 9 controls operations of those components, so that a process of conveying the continuous paper 10 and performing printing thereon proceeds, ink is supplied to the internal tank 82 of each discharge head 35, and further, a part of the ink is circulated.

Figure 4:
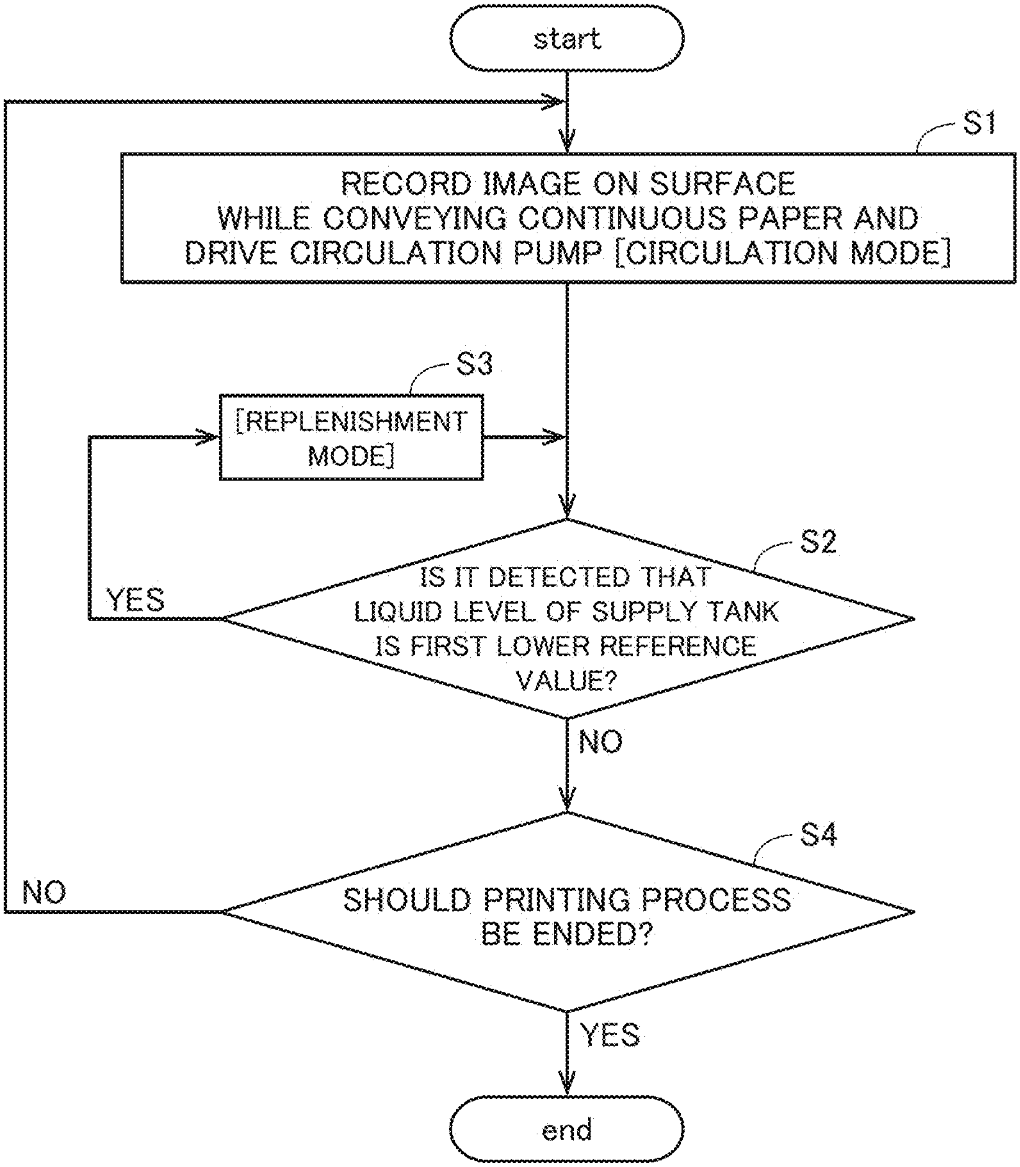
FIG. 4 is a flowchart showing a flow including a continuous-paper conveying and printing process, supply of ink to a discharge head, and circulation of a part of the ink.

2. Overview of Conveying and Printing Process and Procedure for Supply and Circulation of Ink Next, description is given about overview of a process of conveying the continuous paper 10 and performing printing thereon that is performed in the inkjet printing apparatus 1, and a procedure for supply of ink to the internal tank 82 of each of the discharge heads 35 and circulation of a part of the ink. FIG. 4 is a flowchart showing a flow including a process of conveying the continuous paper 10 and performing printing thereon, supply of ink to the internal tank 82 of each of the discharge heads 35, and circulation of a part of the ink.

In performing the process of conveying the continuous paper 10 and performing printing thereon, as shown in FIG. 4, the control unit 9 controls the plurality of nozzles 83 of each of the four discharge heads 35 while conveying the continuous paper 10 along a predetermined conveying path in the lengthwise direction by causing the conveyor unit 2 to operate. As a result of this, ink droplets are discharged onto the surface of the continuous paper 10, so that an image is recorded on the surface of the continuous paper 10.

Further, in performing the process of conveying the continuous paper 10 and performing printing thereon, ink is discharged from the discharge heads 35 while the ink is being circulated through the circulation path, and the circulation path is replenished with ink from the external tank 53, details of which will be given later. Moreover, when a temperature of ink in the circulation path is excessively increased or decreased during the process of conveying the continuous paper 10 and performing printing thereon or at a stage previous thereto, a part of the ink in the circulation path is caused to flow back to the external tank. That is, the control unit 9 of the present preferred embodiment can selectively perform a "circulation mode", a "replenishment mode", and a "backflow mode". In the "circulation mode", ink is circulated through the circulation path. In the "replenishment mode", ink in the external tank 53 is delivered to the circulation path via the branch pipe 66. In the "backflow mode", ink in the circulation path is delivered to the external tank 53 via the bypass pipe 67.

Meanwhile, as advance preparation for the process of conveying the continuous paper 10 and performing printing thereon, ink is stored in the internal chamber 510 of the supply tank 51 such that the liquid level of the ink is at a height of the above-described first upper reference value L11 (first reference value) or greater. Ink is stored in the internal chamber 510 of the supply tank 51 such that the liquid level of the ink is at a height of at least the first lower reference value L12 or greater. Further, as described above, a sufficient amount of ink is constantly stored in the internal chamber 530 of the external tank 53. In performing the "circulation mode", the control unit 9 opens each of the five supply-side on-off valves 73, the five head outlet-side on-off valves 74, and the feedback-side on-off valve 75. Further, the control unit 9 closes the second flow outlet 773 of the first switch valve 77, to cause the flow inlet 771 and the first flow outlet 772 to communicate with each other. Moreover, the control unit 9 closes the flow-in/flow-out port 783 of the second switch valve 78.

In addition, in performing the "circulation mode", the control unit 9 drives each of the circulation pump 71, the heater 76, the pressurization mechanism 515, and the decompression mechanism 524 of each of the four ink supply units 4. Thus, the control unit 9 drives the circulation pump 71, to thereby perform the "circulation mode" in which ink is supplied to the internal tank 82 of each discharge head 35 while the ink is being circulated through the circulation path (step S1). Further, the power of the respective liquid-level sensors 511, 512, and 521, and the power of the temperature sensor 761 are turned on, and then those sensors start measuring.

More specifically, the pressurization mechanism 515 and the decompression mechanism 524 are driven, so that a pressure difference is generated between the internal chamber 510 of the supply tank 51 and the internal chamber 520 of the collecting tank 52. As a result, ink stored in the supply tank 51 can be supplied to the discharge heads 35, and further, ink remaining in the discharge heads 35 can be collected into the collecting tank 52. That is, ink being left undischarged in the discharge heads 35 can be collected into the collecting tank 52. Further, when the circulation pump 71 is driven, there is generated flow of ink from the collecting tank 52 to the supply tank 51 in the internal passage of the feedback pipe 65.

Further, by driving of the heater 76, ink delivered through the internal passage of the feedback pipe 65 can be delivered to the supply tank 51 after the temperature thereof is increased. More specifically, the temperature sensor 761 detects the temperature of ink flowing out of the heater 76, and outputs data regarding a result of detection to the control unit 9. The control unit 9 adjusts an amount of driving of the heater 76 on the basis of the result of detection of ink temperature input from the temperature sensor 761. Thus, ink passing through the heater 76 can be delivered to the supply tank 51 after the temperature thereof is adjusted.

Moreover, by causing ink flowing through the internal passage of the feedback pipe 65 to pass through the first filter 79, it is possible to remove small impurities or the like remaining in ink and then deliver the ink to the supply tank 51. Furthermore, by causing ink flowing through the internal passage of the feedback pipe 65 to pass through the deaeration unit 85, it is possible to deliver ink to the supply tank 51 after deaerating the ink.

After the printing process, in which ink droplets are discharged onto the surface of the continuous paper 10 from each of the discharge heads 35, an amount of ink stored in the supply tank 51 decreases. Then, when detecting that the liquid level of ink stored in the internal chamber 510 of the supply tank 51 is at a height of the first lower reference value L12, the first lower liquid-level sensor 512 outputs a first lower signal to the control unit 9. In other words, when detecting that the height of the liquid level of ink stored in the supply tank 51 decreases to the first lower reference value L12 or lower, the first lower liquid-level sensor 512 outputs a first lower signal to the control unit 9. The control unit 9 checks whether or not the first lower liquid-level sensor 512 has output a first lower signal (step S2). The control unit 9 continues performing the "circulation mode" until the first lower liquid-level sensor 512 outputs a first lower signal (step S2: NO).

When the first lower liquid-level sensor 512 outputs a first lower signal (step S2: YES), the control unit 9 closes the flow outlet 782 of the second switch valve 78 (switch valve), to cause the flow inlet 781 and the flow-in/flow-out port 783 to communicate with each other, and further, drives the external pump 72. Specifically, the control unit 9 drives the circulation pump 71 and the external pump 72 while closing the flow outlet 782 of the second switch valve 78 to cause the flow inlet 781 and the flow-in/flow-out port 783 to communicate with each other. In this manner, the control unit 9 performs the "replenishment mode" in which the above-described ink circulation path is replenished with ink while ink is being circulated through the ink circulation path (step S3).

The control unit 9 starts the "replenishment mode" in response to a first lower signal output from the first lower liquid-level sensor 512. Note that, in the present preferred embodiment, the feedback-side on-off valve 75 is opened also during the "replenishment mode". This allows generation of flow of ink from the circulation pump 71 to the supply tank 51 also during the "replenishment mode", to thereby suppress backflow of ink from the vicinity of the branch point 655 to the circulation pump 71. Alternatively, the feedback-side on-off valve 75 may be closed in performing the "replenishment mode". This enables reduction of a back pressure applied to the circulation pump 71.

When the external pump 71 is driven, flow of ink from the external tank 53 to the branch point 655 is generated in the internal passage of the branch pipe 66. Ink delivered by the external pump 72 arrives at the branch point 655 and merges with ink delivered by the circulation pump 71. After that, the ink flows through the internal passage of the feedback pipe 65 and is directed to the supply tank 51. Further, by causing the ink having merged at the branch point 655 to pass through the heater 76, it is possible to deliver ink whose temperature has been adjusted to the supply tank 51. Further, by causing the ink to pass through the first filter 79, it is possible to remove small impurities or the like remaining in the ink. Moreover, by causing the ink to pass through the deaeration unit 85, it is possible to deaerate the ink.

When the "replenishment mode" is performed, an amount of ink stored in the supply tank 51 is increased. Then, when detecting that the liquid level of ink stored in the internal chamber 510 of the supply tank 51 is at a height of the first upper reference value L11 (first reference value), the first upper liquid-level sensor 511 (first liquid-level sensor) outputs a first upper signal to the control unit 9. In other words, when detecting that the height of the liquid level of ink stored in the supply tank 51 increases to the first upper reference value L11, the first upper liquid-level sensor 511 outputs a first upper signal to the control unit 9. The control unit 9 checks whether or not the first upper liquid-level sensor 511 has output a first upper signal. When the first upper liquid-level sensor 511 outputs a first upper signal, the control unit 9 ends the "replenishment mode", and performs the "circulation mode" again.

After that, the control unit 9 determines whether or not to end the process of conveying the continuous paper 10 and performing printing thereon (step S4). In a case in which there remains image data to be printed, the control unit 9 continues the process of conveying the continuous paper 10 and performing printing thereon (step S4: NO). In this case, the control unit 9 performs again the above-described processes of the steps S1 to S3. In this manner, the control unit 9 repeats the processes of the steps S1 to S3, to thereby proceed with a printing process while conveying the continuous paper 10 and keeping a predetermined amount or more of ink stored in the internal chamber 510 of the supply tank 51.

After a while, when there is no image data to be printed (step S4: YES), the control unit 9 stops the operations of the respective components including the ink supply units 4, and ends the process of conveying the continuous paper 10 and performing printing thereon and supply of ink to the discharge heads 35.

3. Details of Backflow Mode

Next, the "backflow mode" performed by the control unit 9 is described in detail. As described above, it is preferred to set a temperature of ink to, for example, approximately 35° C. in order to stably discharge ink from each discharge head 35. However, in a case in which ink is left in the circulation path with the inkjet printing apparatus 1 being kept undriven for a long period of time, the temperature of ink in the circulation path is found excessively low when trying to re-drive the inkjet printing apparatus 1, in some cases. Meanwhile, when ink having an excessively low temperature is heated at a stretch by using the heater 76 or the like, conversely, the temperature of the ink in the circulation path becomes excessively high, in some cases. In such a case as described in which a temperature of ink is excessively high or low, it is difficult to adjust the temperature of ink to a temperature suitable for discharge, which possibly degrades the workability. The "backflow mode" is performed in order to solve the above-described problem.

As described above, the "backflow mode" is a control method in which ink in the circulation path is delivered to the external tank 53 via the bypass pipe 67. The "backflow mode" is performed, for example, at the time of starting driving the inkjet printing apparatus 1 or immediately before performing the above-described "replenishment mode". However, a timing of performing the "backflow mode" is not limited to those mentioned above. Note that, at a stage previous to the "backflow mode", the power of each of the liquid-level sensors 511, 512, and 521 and the power of the temperature sensor 761 are turned on, and those sensors perform measurement.

3-1. First Preferred Embodiment

Figure 5:
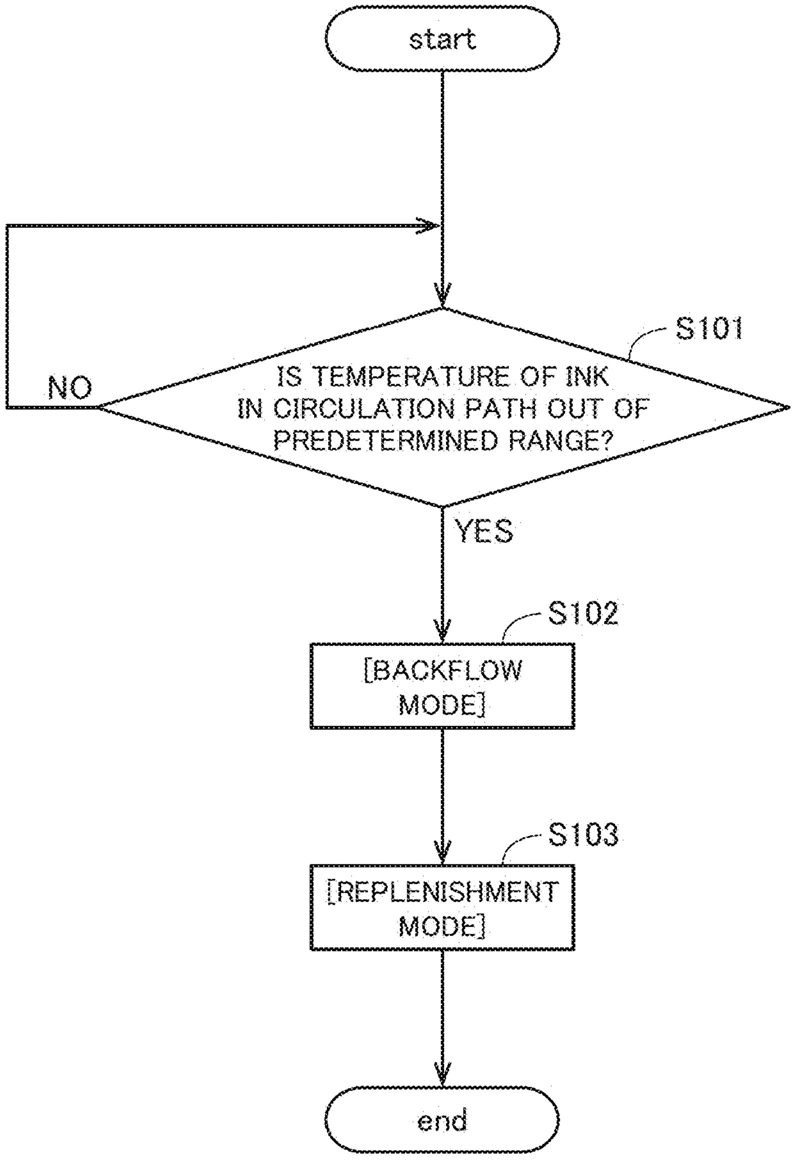
FIG. 5 is a flowchart showing a procedure for performing a backflow mode according to a first preferred embodiment.

FIG. 5 is a flowchart showing a procedure for performing the "backflow mode" according to a first preferred embodiment. In the first preferred embodiment, as shown in FIG. 5, the control unit 9 determines whether or not a result of ink-temperature detection performed by the temperature sensor 761 is out of a predetermined range, on the basis of data input from the temperature sensor 761 (step S101). The control unit 9 determines whether or not a result of ink-temperature detection performed by the temperature sensor 761 is out of, for example, a range from 25° C. or higher to lower than 40° C. The control unit 9 does not perform the "backflow mode" when a result of detection performed by the temperature sensor 761 is within the predetermined range (step S101: NO).

On the other hand, when detecting that a result of detection performed by the temperature sensor 761 is out of the predetermined range (step S101: YES), the control unit 9 performs the "backflow mode" (step S102). In this regard, when a result of detection performed by the temperature sensor 761 is higher than the predetermined range, the control unit 9 stops driving the heater 76 and performs the "backflow mode". For example, the control unit 9 stops driving the heater 76 and performs the "backflow mode" when a result of detection performed by the temperature sensor 761 is equal to or higher than 40° C. Meanwhile, when a result of detection performed by the temperature sensor 761 is lower than the predetermined range, the control unit 9 performs the "backflow mode" while keeping driving the heater 76. For example, the control unit 9 performs the "backflow mode" while keeping driving the heater 76 when a result of detection performed by the temperature sensor 761 is equal to or lower than 25° C. Further, as the "backflow mode" of the present invention, two control methods described below can be performed.

In performing the first control method, first, the control unit 9 opens each of the five supply-side on-off valves 73, the five head outlet-side on-off valves 74, and the feedback-side on-off valve 75. Further, the control unit 9 closes the second flow outlet 773 of the first switch valve 77, to cause the flow inlet 771 and the first flow outlet 772 to communicate with each other. Meanwhile, the control unit 9 closes the flow inlet 781 of the second switch valve 78 (switch valve), to cause the flow outlet 782 and the flow-in/flow-out port 783 to communicate with each other. Further, the control unit 9 drives each of the circulation pump 71, the heater 76, the pressurization mechanism 515, and the decompression mechanism 524 and stops driving the external pump 72.

As a result, a part of ink flowing through the internal passage of the feedback pipe 65 from the collecting tank 52 to the branch point 655 is directed to the branch pipe 66 from the branch point 655. Then, the part of the ink flows into the flow-in/flow-out port 783 of the second switch valve 78, and flows out through the flow outlet 782. Further, the part of the ink flows back to the external tank 53 via the bypass pipe 67. Consequently, even in a case in which the ink in the circulation path has an excessively high temperature, the temperature of the ink can be rapidly reduced by mixture of the ink with ink stored in the external tank 53. In other words, by mixing the part of the ink in the circulation path with ink in the external tank 53, it is possible to rapidly adjust the temperature of the ink.

Meanwhile, when the "backflow mode" is performed, a total amount of ink present in the circulation path is temporarily decreased. In a case where the ink in the circulation path has an excessively low temperature, a total amount of ink in the circulation path is decreased and the ink of such decreased amount is heated by using the heater 76. Hence, the temperature of the ink can be rapidly increased. It is significantly effective to perform the "backflow mode" in a case in which a total amount of ink present in the circulation path is large and the ink has an excessively low temperature, in particular.

As described above, in the present preferred embodiment, a part of ink in the circulation path is caused to flow back to the external tank 53 on the basis of a result of detection of a temperature of ink in the circulation path. This enables rapid adjustment of ink temperature. Note that the control unit 9 performs the "backflow mode" for a predetermined period of time, and then performs the above-described "replenishment mode" (step S103). A period of time for which the "backflow mode" is performed may be determined in terms of time, or may be determined on the basis of a result of detection that is performed by the temperature sensor and serves as a trigger for a start of the "backflow mode". Alternatively, a period of time for which the "backflow mode" is performed may be determined in the other ways.

In performing the second control method, first, the control unit 9 closes each of the five supply-side on-off valves 73 and the feedback-side on-off valve 75. Further, the control unit 9 closes the second flow outlet 773 of the first switch valve 77, to cause the flow inlet 771 and the first flow outlet 772 to communicate with each other. Meanwhile, the control unit 9 closes the flow inlet 781 of the second switch valve 78 (switch valve), to cause the flow outlet 782 and the flow-in/flow-out port 783 to communicate with each other. Further, the control unit 9 stops driving the circulation pump 71 and stops driving the external pump 72. Moreover, the control unit 9 drives the pressurization mechanism 515 connected to the supply tank 51, to strongly pressurize the inside of the supply tank 51. For example, whereas the inside of the supply tank 51 is pressurized at approximately 10 kPa by using the pressurization mechanism 515 for supply of ink to the discharge heads 35 in performing the "circulation mode" or the "replenishment mode", the inside of the supply tank 51 is pressurized at approximately 120 kPa in performing the "backflow mode".

As a result, ink flows back from the supply tank 51 to the branch point 655 through the internal passage of the feedback pipe 65, and is directed to the branch pipe 66 from the branch point 655. Then, the ink flows into the flow-in/flow-out port 783 of the second switch valve 78, and flows out through the flow outlet 782. Further, the ink flows back to the external tank 53 via the bypass pipe 67. Consequently, even in a case in which the ink in the circulation path has an excessively high temperature, the temperature of the ink can be rapidly reduced by mixture of the ink with ink stored in the external tank 53 in the same manner as in the first control method. In other words, by mixing the part of the ink in the circulation path with ink in the external tank 53, it is possible to rapidly adjust the temperature of the ink.

Further, in the same manner as in the first control method, when the "backflow mode" is performed, a total amount of ink present in the circulation path is temporarily decreased. In a case where the ink in the circulation path has an excessively low temperature, a total amount of ink in the circulation path is decreased and the ink of such decreased amount is heated by using the heater 76. Hence, the temperature of the ink can be rapidly increased. It is significantly effective to perform the "backflow mode" in a case in which a total amount of ink present in the circulation path is large and the ink has an excessively low temperature, in particular.

As described above, also in a case in which the second control method is performed, a part of ink in the circulation path is caused to flow back to the external tank 53 on the basis of a result of detection of a temperature of ink in the circulation path. This enables rapid adjustment of ink temperature. Moreover, the control unit 9 performs the "backflow mode" for a predetermined period of time, and then performs the above-described "replenishment mode" in the same manner as in the first control method.

3-2. Second Preferred Embodiment

Next, the "backflow mode" according to a second preferred embodiment is described.

Figure 6:
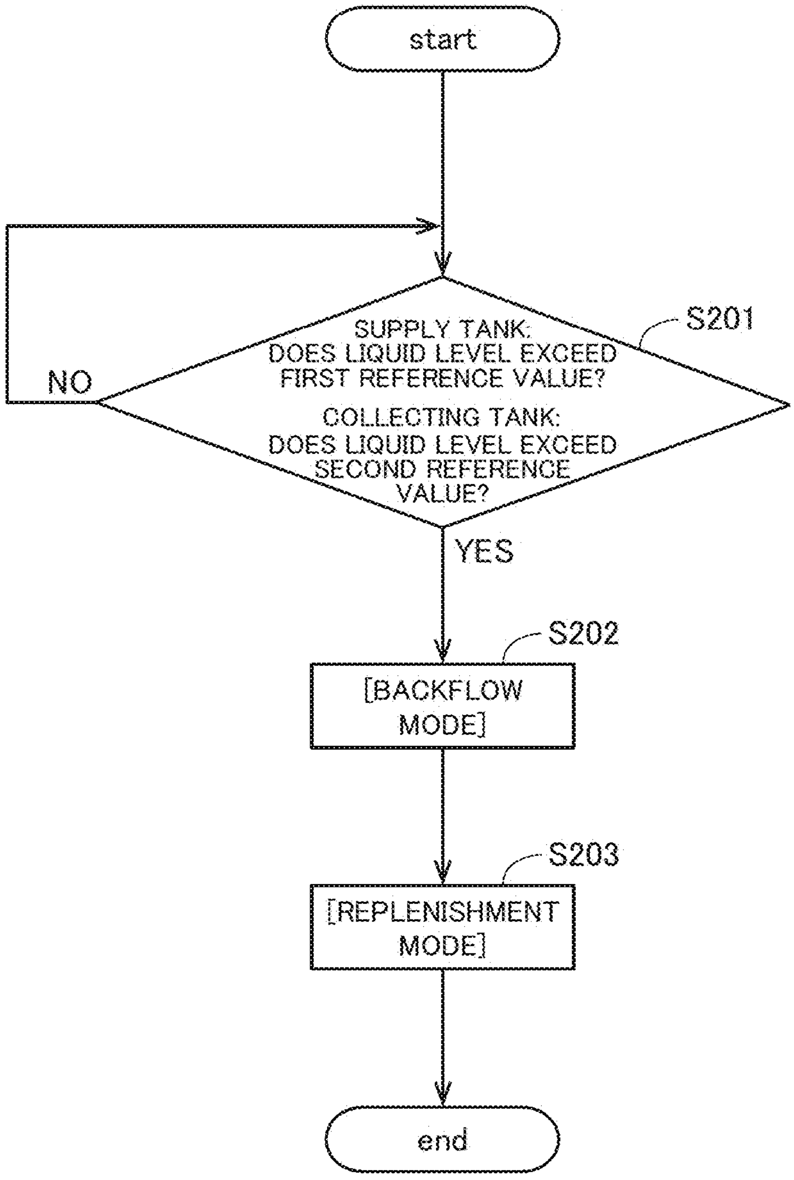
FIG. 6 is a flowchart showing a procedure for performing a backflow mode according to a second preferred embodiment.

According to the above-described first preferred embodiment, the control unit 9 performs the "backflow mode" when detecting that a result of detection performed by the temperature sensor 761 is out of the predetermined range. However, as briefly mentioned above, in a case in which a total amount of ink present in the circulation path is large, it takes time for temperature adjustment in the first place, and hence the workability is liable to be degraded. In view of this, according to the second preferred embodiment, the "backflow mode" is performed when it is detected that a total amount of ink present in the circulation path is large. FIG. 6 is a flowchart showing a procedure for performing the "backflow mode" according to the second preferred embodiment.

As shown in FIG. 6, according to the second preferred embodiment, a first upper signal output from the first upper liquid-level sensor 511 (first liquid-level sensor) and a second signal output from the second liquid-level sensor 521 are referred to. Then, when it is detected that a total amount of ink present in the circulation path is considerably large during the above-described "replenishment mode" or the like, the "backflow mode" is performed. For example, when the "replenishment mode" is further performed after a first upper signal and a second signal are output, and a total amount of ink present in the circulation path is further increased, it is detected that a total amount of ink present in the circulation path is considerably large.

In other words, the control unit 9 determines whether or not the liquid level of ink stored in the supply tank 51 is at a height exceeding the first upper reference value L11 (first reference value), from a result of detection performed by the first upper liquid-level sensor 511 (first liquid-level sensor). Further, the control unit 9 determines whether or not the liquid level of ink stored in the collecting tank 52 is at a height exceeding the second reference value L2, from a result of detection performed by the second liquid-level sensor 521 (step S201).

Then, when detecting that the liquid level of ink stored in the supply tank 51 is at a height exceeding the first upper reference value L11 (first reference value), and further detecting that the liquid level of ink stored in the collecting tank 52 is at a height exceeding the second reference value L2 (step S201: YES), the control unit 9 determines that a total amount of ink present in the circulation path is considerably large, and performs the "backflow mode" (step S202).

For the "backflow mode", two control methods similar to those described above can be performed. That is, in the present preferred embodiment, a part of ink in the circulation path is caused to flow back to the external tank 53 on the basis of a result of detection of the heights of the liquid levels of ink in the supply tank 51 and the collecting tank 52. Hence, ink temperature can be rapidly adjusted.

Moreover, the control unit 9 performs the "backflow mode" for a predetermined period of time, and then performs the above-described "replenishment mode" (step S203). In the present preferred embodiment, for an end point of a period of time for which the "backflow mode" is to be performed, signals from the respective liquid-level sensors 511, 512, and 521 can be further referred to. For example, the control unit 9 may end the "backflow mode" when the first lower liquid-level sensor 512 outputs a first lower signal. Alternatively, the control unit 9 may end the "backflow mode" in response to a signal output from another liquid-level sensor mounted in the supply tank 51 or the collecting tank 52.

Consequently, the height of the liquid level of ink in the supply tank 51 or the collecting tank 52 can be adjusted to the reference value to be detected by each liquid-level sensor. This can prevent an excessive increase of an amount of ink present in the circulation path. Further, an amount of ink stored in the supply tank 51 or the collecting tank 52 can be more accurately grasped, which results in more accurately grasping a total amount of ink present in the circulation path. Further, by additionally performing the "replenishment mode" or the "backflow mode" described above on the basis of a result of grasping of a total amount of ink present in the circulation path, it is possible to adjust an amount of ink in the circulation path.

Thus, the configuration according to the present preferred embodiment produces both of an effect of facilitating temperature adjustment by reduction of a total amount of ink present in the circulation path, and an effect of more accurately grasping a total amount of ink present in each part of the circulation path, which could not be grasped only with an output from each liquid-level sensor.

What is claimed is:

1. An inkjet printing apparatus that discharges ink onto a printing medium to perform printing, comprising:

an ink circulation path including a discharge head configured to discharge ink, a supply tank in which ink supplied to the discharge head is stored, a collecting tank in which ink collected from the discharge head is stored, a supply pipe connecting the supply tank and the discharge head, and a feedback pipe connecting the collecting tank and the supply tank;

a circulation pump configured to deliver ink from the collecting tank to the supply tank via the feedback pipe;

an external tank in which ink is stored outside the circulation path;

a branch pipe connecting a branch point on the feedback pipe and the external tank;

an external pump configured to deliver ink from the external tank to the circulation path via the branch pipe;

a switch valve configured to switch between a state in which the external tank communicates with the branch point via the external pump and the branch pipe and a state in which the external tank communicates with the branch point not via the external pump, but via the bypass pipe connecting the branch pipe and the external tank;

a control unit configured to control the discharge head, the circulation pump, the external pump, and the switch valve; and a temperature sensor configured to detect a temperature of ink in the circulation path, wherein the control unit is capable of selectively performing a replenishment mode in which ink in the external tank is delivered to the circulation path via the branch pipe and a backflow mode in which ink in the circulation path is delivered to the external tank via the bypass pipe, and when the control unit detects that a result of detection performed by the temperature sensor is out of a predetermined range, the control unit performs the backflow mode, and performs the replenishment mode after the backflow mode.

2. The inkjet printing apparatus according to claim 1, wherein the switch valve is a three-way valve including a flow inlet, a flow outlet, and a flow-in/flow-out port, the flow inlet communicates with the external pump, the flow outlet communicates with the external tank via the bypass pipe, the flow-in/flow-out port communicates with the circulation path, the control unit drives the circulation pump and the external pump while closing the flow outlet of the switch valve to cause the flow inlet and the flow-in/flow-out port to communicate with each other, in the replenishment mode, and the control unit drives the circulation pump and stops driving the external pump while closing the flow inlet of the switch valve to cause the flow outlet and the flow-in/flow-out port to communicate with each other, in the backflow mode.

3. The inkjet printing apparatus according to claim 1, further comprising:

a supply-side on-off valve interposed in the supply pipe;

a feedback-side on-off valve interposed between the circulation pump and the branch point in the feedback pipe; and a pressurization mechanism configured to pressurize an inside of the supply tank, wherein the switch valve is a three-way valve including a flow inlet, a flow outlet, and a flow-in/flow-out port, the flow inlet communicates with the external pump, the flow outlet communicates with the external tank via the bypass pipe, the flow-in/flow-out port communicates with the circulation path, the control unit is capable of further controlling the supply-side on-off valve, the feedback-side on-off valve, and the pressurization mechanism, the control unit drives the circulation pump and the external pump while closing the flow outlet of the switch valve to cause the flow inlet and the flow-in/flow-out port to communicate with each other, in the replenishment mode, and the control unit closes the flow inlet of the switch valve to cause the flow outlet and the flow-in/flow-out port to communicate with each other, stops driving the circulation pump and the external pump, and drives the pressurization mechanism while closing the supply-side on-off valve and the feedback-side on-off valve, in the backflow mode.

4. An inkjet printing apparatus that discharges ink onto a printing medium to perform printing, comprising:

an ink circulation path including a discharge head configured to discharge ink, a supply tank in which ink supplied to the discharge head is stored, a collecting tank in which ink collected from the discharge head is stored, a supply pipe connecting the supply tank and the discharge head, and a feedback pipe connecting the collecting tank and the supply tank;

a circulation pump configured to deliver ink from the collecting tank to the supply tank via the feedback pipe;

an external tank in which ink is stored outside the circulation path;

a branch pipe connecting a branch point on the feedback pipe and the external tank;

an external pump configured to deliver ink from the external tank to the circulation path via the branch pipe;

a switch valve configured to switch between a state in which the external tank communicates with the branch point via the external pump and the branch pipe and a state in which the external tank communicates with the branch point not via the external pump, but via the bypass pipe connecting the branch pipe and the external tank;

a control unit configured to control the discharge head, the circulation pump, the external pump, and the switch valve;

a first liquid-level sensor configured to detect that a liquid level of ink stored in the supply tank is at a height of a first reference value; and a second liquid-level sensor configured to detect that a liquid level of ink stored in the collecting tank is at a height of a second reference value, wherein the control unit is capable of selectively performing a replenishment mode in which ink in the external tank is delivered to the circulation path via the branch pipe and a backflow mode in which ink in the circulation path is delivered to the external tank via the bypass pipe, and when the control unit detects that the liquid level of ink stored in the supply tank is at a height exceeding the first reference value, from a result of detection performed by the first liquid-level sensor, and detects that the liquid level of ink stored in the collecting tank is at a height exceeding the second reference value, from a result of detection performed by the second liquid-level sensor, the control unit performs the backflow mode and performs the replenishment mode after the backflow mode.

5. The inkjet printing apparatus according to claim 4, wherein the switch valve is a three-way valve including a flow inlet, a flow outlet, and a flow-in/flow-out port, the flow inlet communicates with the external pump, the flow outlet communicates with the external tank via the bypass pipe, the flow-in/flow-out port communicates with the circulation path, the control unit drives the circulation pump and the external pump while closing the flow outlet of the switch valve to cause the flow inlet and the flow-in/flow-out port to communicate with each other, in the replenishment mode, and the control unit drives the circulation pump and stops driving the external pump while closing the flow inlet of the switch valve to cause the flow outlet and the flow-in/flow-out port to communicate with each other, in the backflow mode.

6. The inkjet printing apparatus according to claim 4, further comprising:

a supply-side on-off valve interposed in the supply pipe;

a feedback-side on-off valve interposed between the circulation pump and the branch point in the feedback pipe; and a pressurization mechanism configured to pressurize an inside of the supply tank, wherein the switch valve is a three-way valve including a flow inlet, a flow outlet, and a flow-in/flow-out port, the flow inlet communicates with the external pump, the flow outlet communicates with the external tank via the bypass pipe, the flow-in/flow-out port communicates with the circulation path, the control unit is capable of further controlling the supply-side on-off valve, the feedback-side on-off valve, and the pressurization mechanism, the control unit drives the circulation pump and the external pump while closing the flow outlet of the switch valve to cause the flow inlet and the flow-in/flow-out port to communicate with each other, in the replenishment mode, and the control unit closes the flow inlet of the switch valve to cause the flow outlet and the flow-in/flow-out port to communicate with each other, stops driving the circulation pump and the external pump, and drives the pressurization mechanism while closing the supply-side on-off valve and the feedback-side on-off valve, in the backflow mode.

* * * * *